US011477848B2

(12) United States Patent
Dizdarevic et al.

(10) Patent No.: US 11,477,848 B2
(45) Date of Patent: Oct. 18, 2022

(54) DISSEMINATING ALERTS OR OTHER NOTIFICATIONS USING PROSE DIRECT DISCOVERY SIGNALING

(71) Applicant: AT&T Intellectual Property I, L.P., Atlanta, GA (US)

(72) Inventors: Jasminka Dizdarevic, Austin, TX (US); John Hursey, Lawrenceville, GA (US); Sreejith Menon, Herndon, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 186 days.

(21) Appl. No.: 16/915,402

(22) Filed: Jun. 29, 2020

(65) Prior Publication Data
US 2021/0410227 A1     Dec. 30, 2021

(51) Int. Cl.
| | | |
|---|---|---|
| H04W 4/00 | (2018.01) | |
| H04W 88/04 | (2009.01) | |
| H04W 8/00 | (2009.01) | |
| H04B 7/026 | (2017.01) | |
| H04W 48/16 | (2009.01) | |
| H04W 76/14 | (2018.01) | |
| H04W 72/04 | (2009.01) | |
| H04W 12/12 | (2021.01) | |

(52) U.S. Cl.
CPC ............ *H04W 88/04* (2013.01); *H04B 7/026* (2013.01); *H04W 8/005* (2013.01); *H04W 12/12* (2013.01); *H04W 48/16* (2013.01); *H04W 72/0406* (2013.01); *H04W 76/14* (2018.02)

(58) Field of Classification Search
USPC ........................................................ 370/329
See application file for complete search history.

(56) References Cited

U.S. PATENT DOCUMENTS

| | | | | |
|---|---|---|---|---|
| 10,455,406 B2* | 10/2019 | Baek | ...................... | H04W 76/12 |
| 2012/0071168 A1* | 3/2012 | Tomici | .................. | H04W 76/15 |
| | | | | 455/445 |
| 2012/0190325 A1* | 7/2012 | Abu-Hakima | ........ | H04W 4/021 |
| | | | | 455/404.2 |
| 2013/0287012 A1* | 10/2013 | Pragada | ................ | H04W 76/22 |
| | | | | 370/338 |
| 2013/0288668 A1* | 10/2013 | Pragada | .............. | H04W 84/042 |
| | | | | 455/426.1 |
| 2014/0341109 A1* | 11/2014 | Cartmell | ............... | H04W 40/02 |
| | | | | 370/328 |
| 2015/0080030 A1* | 3/2015 | Moldavsky | ............. | H04W 4/80 |
| | | | | 455/456.3 |
| 2015/0080031 A1* | 3/2015 | Moldavsky | ........ | G06Q 30/0261 |
| | | | | 455/456.3 |

(Continued)

*Primary Examiner* — Marceau Milord
(74) *Attorney, Agent, or Firm* — Guntin & Gust, PLC; Douglas Schnabel

(57) ABSTRACT

Aspects of the subject disclosure may include, for example, detecting, by a wireless communication device, a transmission, by a radio access network node, of an alert message, identifying contents of the alert message, determining that the wireless communication device is authorized to relay the contents of the alert message, generating alert information comprising the contents of the alert message, and transmitting a ProSe direct discovery message comprising the alert information. Other embodiments are disclosed.

20 Claims, 15 Drawing Sheets

(56) References Cited

U.S. PATENT DOCUMENTS

| | | | |
|---|---|---|---|
| 2015/0189486 A1* | 7/2015 | Lee | H04W 4/06 370/259 |
| 2016/0381720 A1* | 12/2016 | Baek | H04W 8/005 370/329 |
| 2017/0346858 A1* | 11/2017 | Vashi | H04W 76/19 |
| 2018/0026733 A1* | 1/2018 | Yang | H04N 21/6112 725/33 |
| 2018/0092017 A1* | 3/2018 | Freda | H04B 7/15528 |
| 2018/0115937 A1* | 4/2018 | Poitau | H04W 76/14 |
| 2018/0124674 A1* | 5/2018 | Vutukuri | H04W 36/03 |
| 2018/0234942 A1* | 8/2018 | Kim | H04L 61/2076 |
| 2018/0295497 A1* | 10/2018 | Kim | H04W 60/04 |
| 2018/0295671 A1* | 10/2018 | Kim | H04W 76/00 |
| 2018/0317268 A1* | 11/2018 | Kim | H04W 40/04 |
| 2019/0082495 A1* | 3/2019 | Kim | H04W 76/10 |
| 2019/0098692 A1* | 3/2019 | Atari | H04L 12/1407 |
| 2019/0349951 A1* | 11/2019 | Ahmad | H04W 76/18 |
| 2019/0380152 A1* | 12/2019 | Abedini | H04W 56/0045 |
| 2020/0178343 A1* | 6/2020 | Kim | H04W 76/27 |
| 2020/0228948 A1* | 7/2020 | Watfa | H04W 36/0061 |
| 2020/0305167 A1* | 9/2020 | Freda | H04W 72/10 |
| 2021/0127343 A1* | 4/2021 | Mladin | H04W 76/14 |
| 2021/0168574 A1* | 6/2021 | Zhang | H04W 56/001 |
| 2021/0385714 A1* | 12/2021 | Paladugu | H04W 36/08 |
| 2021/0400448 A1* | 12/2021 | Adjakple | H04W 4/40 |

* cited by examiner

1200

DISSEMINATING ALERTS OR OTHER NOTIFICATIONS USING PROSE DIRECT DISCOVERY SIGNALING

FIELD OF THE DISCLOSURE

The subject disclosure relates to disseminating alerts or other notifications using ProSe direct discovery signaling.

BACKGROUND

A Public Safety UE which is at the cell edge, or in a disaster-hit area may encounter poor or no radio signal quality while attempting to connect to the E-UTRAN network. This may cause UE to not receive critical alerts & notifications from the network. One such example is wireless emergency alerts originated by law enforcement or national weather service agencies. These alerts are referred to as Wireless Emergency Alerts (WEA) and are distributed by wireless networks.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for using ProSe discovery signaling to disseminate the contents of alert messages to devices that are outside of network coverage. According to techniques described herein, a device located within network coverage may receive an alert message from a radio access network node. In some embodiments, the alert message may comprise a wireless emergency alert (WEA) message. In some embodiments, the device may relay the contents of the alert message to one or more other devices by transmitting a ProSe direct discovery message that comprises those contents. In some embodiments, the ProSe direct discovery message may comprise a PC5_DISCOVERY message, such as a PC5_DISCOVERY message for relay discovery additional information. Other embodiments are described in the subject disclosure.

One or more aspects of the subject disclosure include an apparatus comprising a processing system including a processor and a memory that stores executable instructions that, when executed by the processing system, facilitate performance of operations. The operations can include detecting a transmission, by a radio access network node, of an alert message, identifying contents of the alert message, determining that the device is authorized to relay the contents of the alert message, generating alert information comprising the contents of the alert message, and transmitting a ProSe direct discovery message comprising the alert information.

One or more aspects of the subject disclosure include a non-transitory machine-readable medium, comprising executable instructions that, when executed by a processing system of a wireless communication device, the processing system including a processor, facilitate performance of operations. The operations can include detecting a transmission, by a radio access network node, of an alert message, identifying contents of the alert message, determining that the wireless communication device is authorized to relay the contents of the alert message, generating alert information comprising the contents of the alert message, and transmitting a ProSe direct discovery message comprising the alert information.

One or more aspects of the subject disclosure include a method. The method can include detecting, by a processing system of a wireless communication device, the processing system including a processor, a transmission, by a radio access network node, of an alert message, identifying contents of the alert message, determining that the wireless communication device is authorized to relay the contents of the alert message, generating alert information comprising the contents of the alert message, and transmitting a ProSe direct discovery message comprising the alert information.

Figure 1:
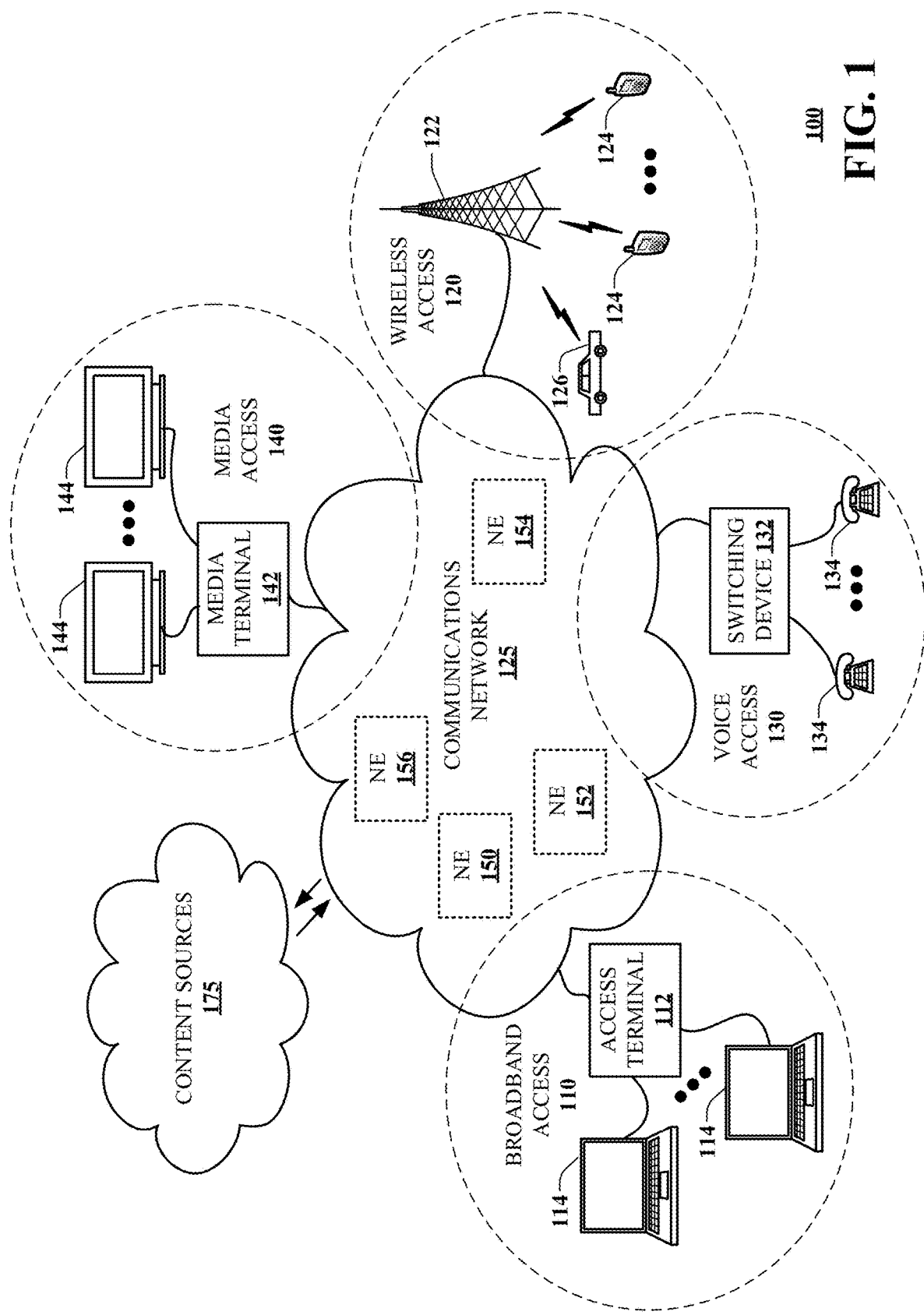
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part detecting, by a wireless communication device, a transmission, by a radio access network node, of an alert message, identifying contents of the alert message, determining that the wireless communication device is authorized to relay the contents of the alert message, generating alert information comprising the contents of the alert message, and transmitting a ProSe direct discovery message comprising the alert information. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
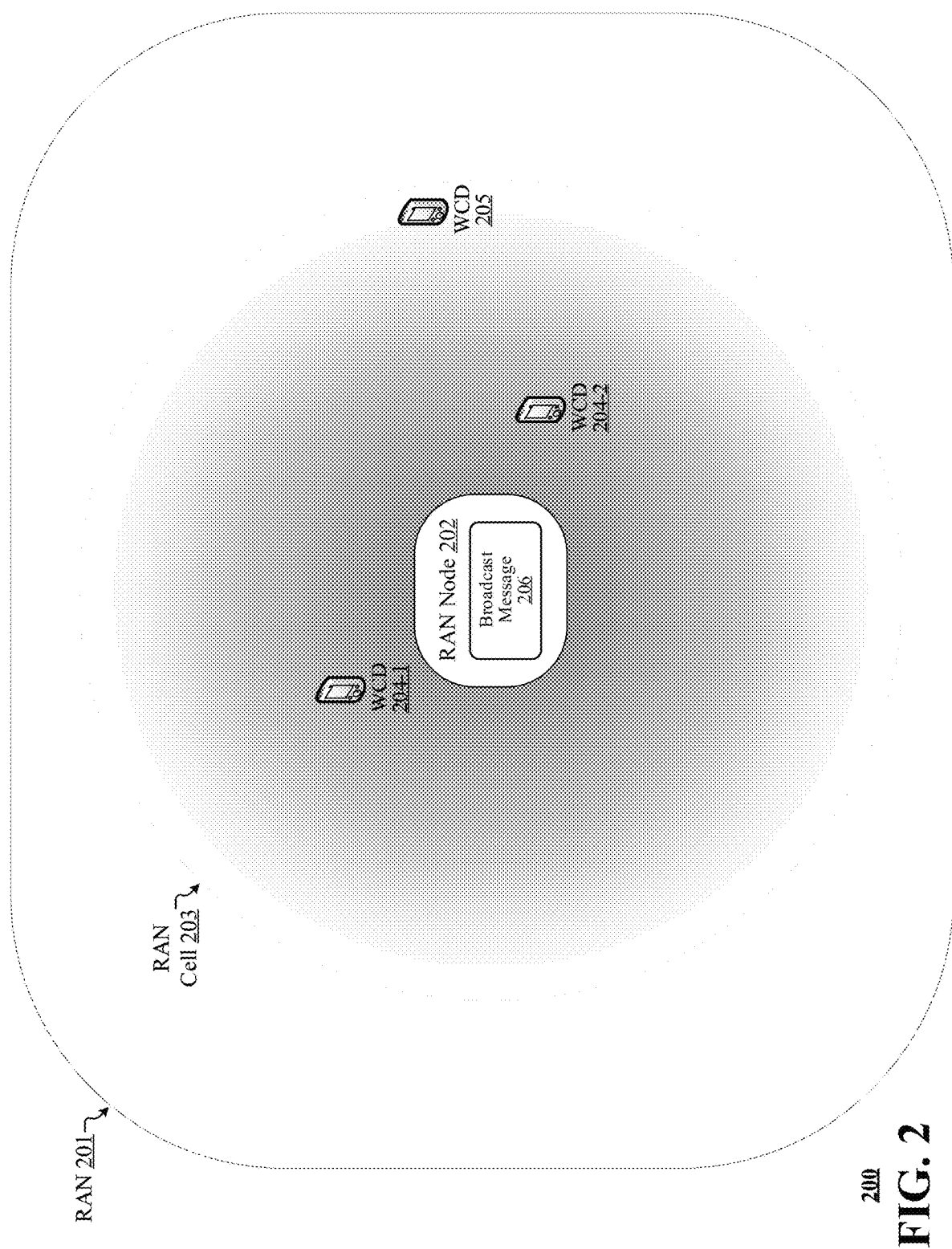
FIG. 2 is a block diagram illustrating an example, non-limiting embodiment of a first operating environment in accordance with various aspects described herein.

FIG. 2 illustrates an example of an operating environment 200 that may be representative of some embodiments. In operating environment 200, a radio access network (RAN) 201 comprises a RAN node 202, which serves a RAN cell 203. Wireless communication devices (WCDs) 204-1, 204-2, and 205 are located within RAN cell 203. WCDs 204-1 and 204-2 are located at points relatively close to RAN node 202, while WCD 205 is positioned at the cell edge, relatively distant from RAN node 202. In various embodiments, RAN 201 may comprise an Evolved Universal Mobile Telecommunications System Terrestrial Radio Access Network (E-UTRAN), and RAN node 202 may comprise an evolved node B (eNB). In some embodiments, RAN 201 may comprise a 3GPP 5G RAN, such as an NG-RAN, and RAN node 202 may comprise an NG-eNB or a gNB. WCDs 204-1, 204-2, and 205 may comprise user equipment (UE) operating in accordance with protocols governing wireless communications in RAN 201. For example, if RAN 201 is an E-UTRAN, WCDs 204-1, 204-2, and 205 may be UEs operating in accordance with 3GPP 4G LTE protocols. The embodiments are not limited to this example.

In operating environment 200, RAN node 202 transmits a broadcast message 206, which may generally comprise a message directed to all devices operating within RAN cell 203. As they are relatively close to RAN node 202, and thus may receive wireless signals transmitted by RAN node 202 with relatively high received signal strength, WCDs 204-1 and 204-2 may have no problem receiving broadcast message 206. On the other hand, due to its position at the cell edge, WCD 205 may receive wireless signals transmitted by RAN node 202 with relatively low received signal strength. If the received signal strength is too weak, WCD 205 may be unable to receive broadcast message 206.

Figure 3:
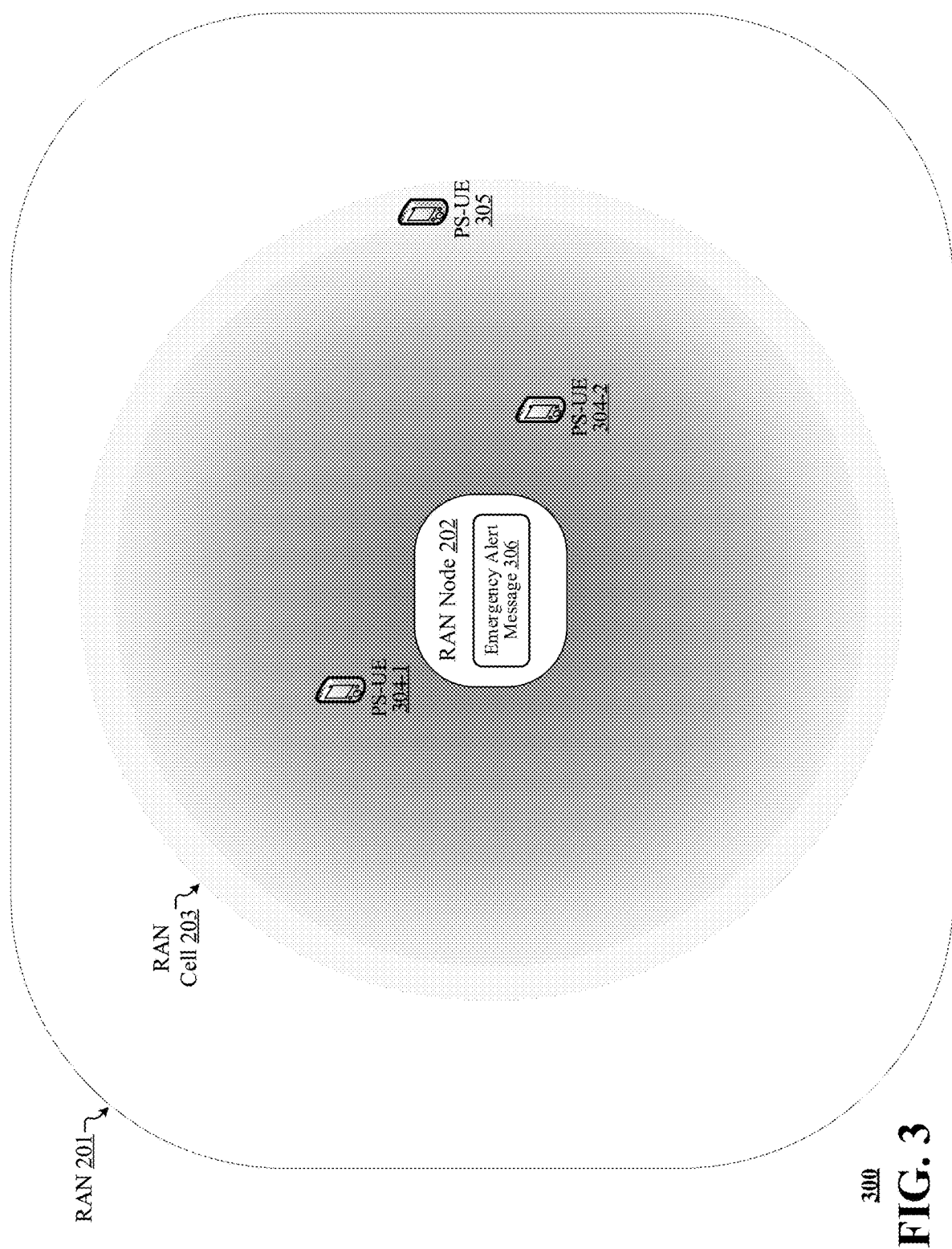
FIG. 3 is a block diagram illustrating an example, non-limiting embodiment of a second operating environment in accordance with various aspects described herein.

FIG. 3 illustrates an example of an operating environment 300. Operating environment 300 may be representative of various embodiments in which RAN node 202 transmits a broadcast message in order to provide devices in RAN cell 203 with notification of an emergency. In operating environment 300, the WCDs 204-1, 204-2, and 205 of FIG. 2 operate as public safety UEs (PS-UEs) 304-1, 304-2, and 305, respectively. RAN node 202 transmits an emergency alert message 306 in order to alert devices in RAN cell 203 to an emergency. PS-UEs 304-1 and 304-2 may be able to receive emergency alert message 306 due to their proximity to RAN node 202. On the other hand, due to its location at the cell edge, PS-UE 305 may be unable to receive emergency alert message 306. According to some embodiments, emergency alert message 306 may comprise a wireless emergency alert (WEA) alert message. In various embodiments, RAN node 202 may transmit emergency alert message 306 by including it in a system information block (SIB) that RAN node 202 broadcasts in RAN cell 203. The embodiments are not limited in this context.

Figure 4:
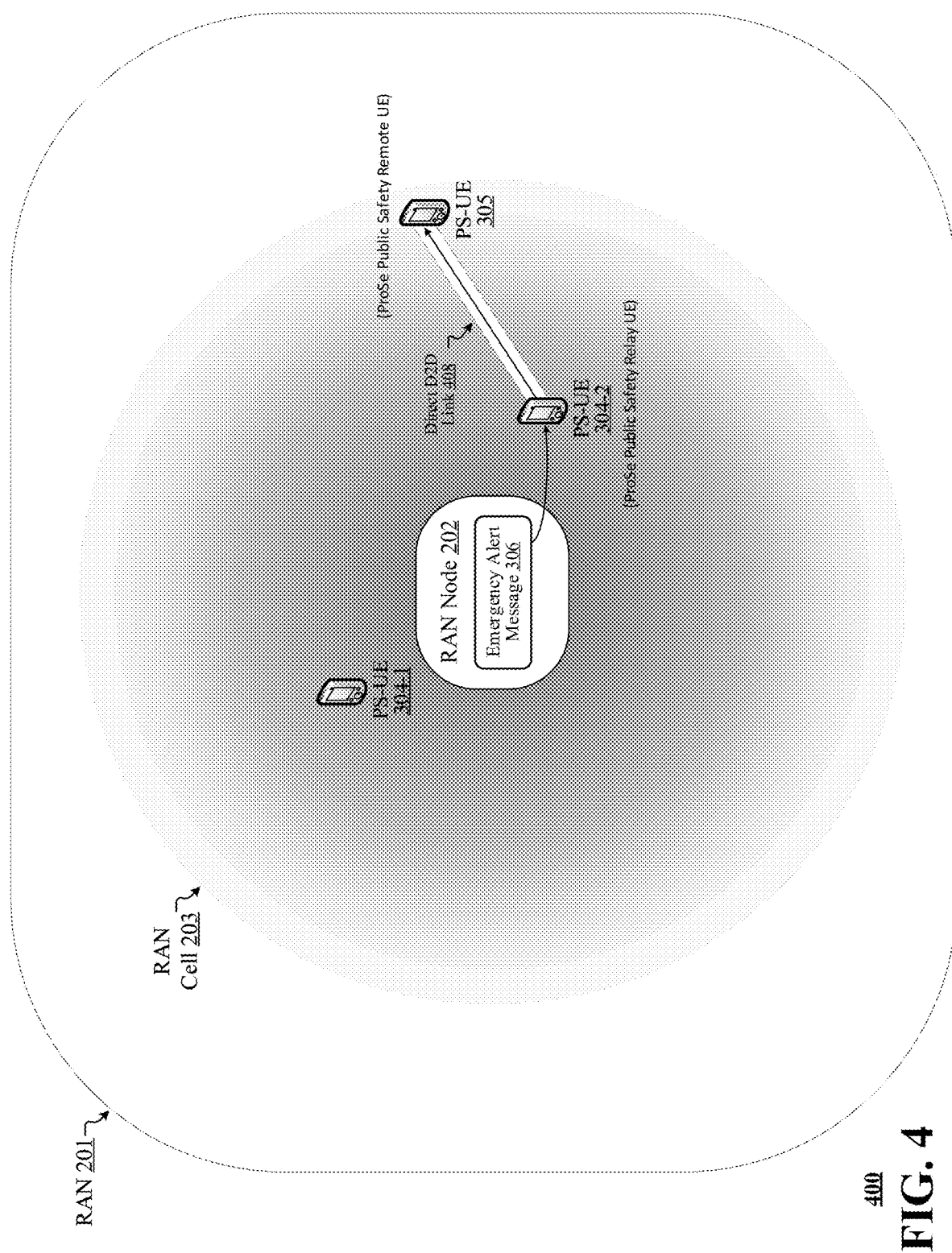
FIG. 4 is a block diagram illustrating an example, non-limiting embodiment of a third operating environment in accordance with various aspects described herein.

FIG. 4 depicts an example of an operating environment 400 that illustrates an approach to providing PS-UE 305 with the information comprised in emergency alert message 306 when PS-UE 305 is unable to receive emergency alert message 306 from the network. In operating environment 400, PS-UE 304-2 may serve as a relay node and relay the contents of emergency alert message 306 to PS-UE 305 after receiving emergency alert message 306 from RAN node 202. In the context of this role as a relayer of the contents of emergency alert message 306, PS-UE 304-2 may be referred to as a proximity services (ProSe) public safety relay UE. In the context of its role as a relayee of the contents of emergency alert message 306, PS-UE 305 may be referred to as a ProSe public safety remote UE. The embodiments are not limited in this context.

In operating environment 400, PS-UE 304-2 may relay the contents of emergency alert message 306 to PS-UE 305 via a direct D2D link 408. Direct D2D link 408 may generally comprise a type of link that can convey unicast and/or evolved multimedia broadcast multicast services (eMBMS) traffic directly between UEs when one or both of those UEs is/are outside of network coverage. In some embodiments, communications over direct D2D link 408 may comprise communications via a PC5 interface. In various embodiments, PS-UE 304-2 may provide the contents of emergency alert message 306 to PS-UE 305 via direct D2D link 408 as unicast traffic, which may be in the form of IP packets. The embodiments are not limited in this context.

In some embodiments, PS-UE 304-2 and PS-UE 305 may communicate via direct D2D link 408 according to ProSe direct communication procedures. In various embodiments, in order to establish direct D2D link 408 and use it to communicate according to the ProSe direct communication procedures, PS-UE 304-2 and PS-UE 305 may first need to perform ProSe direct discovery procedures in order to detect and discover each other. In some embodiments, PS-UE 304-2 and PS-UE 305 may perform ProSe direct discovery procedures that are specifically designated for use by public safety UEs in situations involving threats to public safety. Such procedures are hereinafter referred to as ProSe public safety direct discovery procedures, and may also be referred to as ProSe direct discovery for public safety use procedures. The embodiments are not limited in this context.

Figure 5:
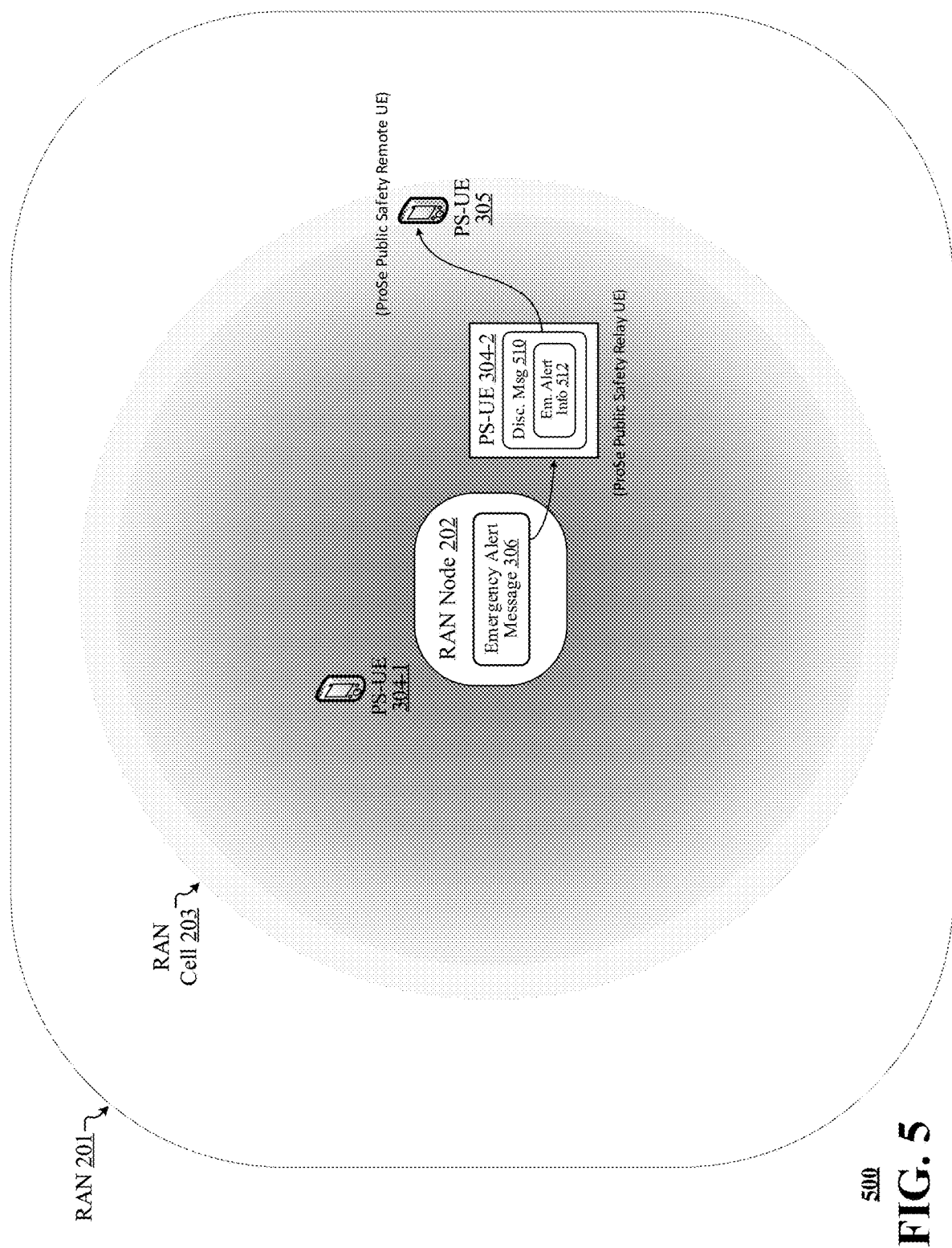
FIG. 5 is a block diagram illustrating an example, non-limiting embodiment of a fourth operating environment in accordance with various aspects described herein.

FIG. 5 depicts an example of an operating environment 500 that illustrates an alternate approach to providing PS-UE 305 with the contents of emergency alert message 306. In operating environment 500, as in operating environment 400 of FIG. 4, PS-UE 304-2 may act as a ProSe public safety relay UE and relay the contents of emergency alert message 306 to PS-UE 305, which may act as a ProSe public safety remote UE. However, rather than relaying the contents of emergency alert message 306 to PS-UE 305 as unicast traffic via direct D2D link 408, PS-UE 304-2 may provide the contents of emergency alert message 306 to PS-UE 305 in conjunction with performing operations associated with ProSe public safety direct discovery procedures. In various embodiments, this approach may facilitate providing the contents of emergency alert message 306 to PS-UE 305 with lower latency, as PS-UE 304-2 may not need to wait for establishment of an IP bearer as would be required if it were to relay the contents of emergency alert message 306 to PS-UE 305 as unicast traffic via direct D2D link 408 of FIG. 4.

In some embodiments, PS-UE 304-2 may be configured to provide the contents of emergency alert message 306 to PS-UE 305 by including those contents as emergency alert information 512 within a discovery message 510 that PS-UE 304-2 sends to PS-UE 305 in conjunction with ProSe public safety direct discovery procedures. In various embodiments, discovery message 510 may comprise a ProSe direct discovery message, such as a PC5_DISCOVERY message. In some such embodiments, discovery message 510 may comprise a PC5_DISCOVERY for Relay Discovery Additional Information message that PS-UE 304-2 sends to PS-UE 305 in conjunction with an announcing UE procedure for relay discovery additional information. In various embodiments, emergency alert information 512 may be comprised in an information element (IE) included within discovery message 510. In some such embodiments, discovery message 510 may include another IE that comprises an indication of the presence of the IE comprising emergency alert information 512. For example, in various embodiments, a bit within another IE may be set to a value indicating the presence of the IE comprising emergency alert information 512. The embodiments are not limited in this context.

Figure 6:
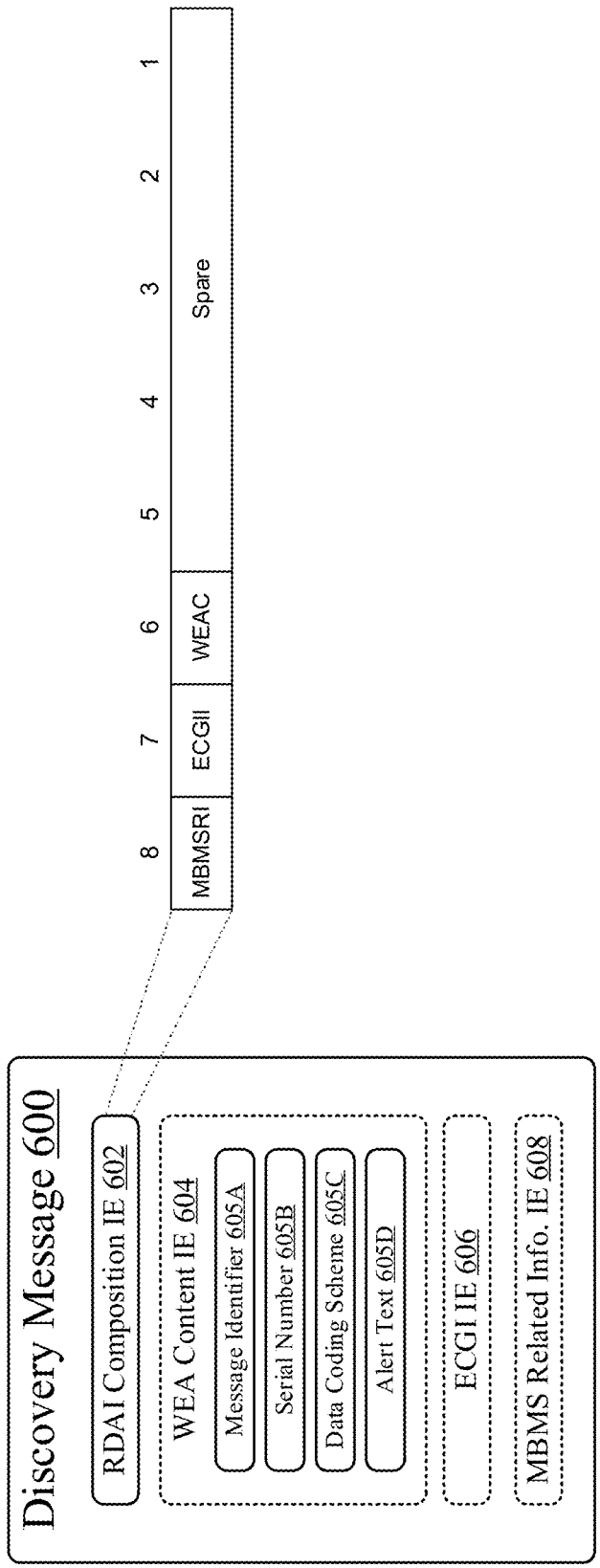
FIG. 6 is a block diagram illustrating an example, non-limiting embodiment of a discovery message in accordance with various aspects described herein.

FIG. 6 illustrates a discovery message 600 comprising a format that may be representative of discovery message 510 of FIG. 5 according to some embodiments. As reflected in FIG. 6, according to a defined format for discovery message 600, discovery message 600 may include an RDAI Composition IE 602. As shown in FIG. 6, RDAI Composition IE 602 may comprise eight bits. Bit 6 of RDAI Composition IE 602 may be set to indicate the presence or absence of a WEA Content IE 604 within discovery message 600. Bit 7 of RDAI Composition IE 602 may be set to indicate the presence or absence of an ECGI IE 606 within discovery message 600. Bit 8 of RDAI Composition IE 602 may be set to indicate the presence or absence of an MBMS Related Information IE 608 within discovery message 600.

If discovery message 600 is being used as the discovery message 510 that conveys emergency alert information 512 in operating environment 500 of FIG. 5, WEA Content IE 604 may be present within discovery message 600, and bit 6 of RDAI Composition IE 602 may be set accordingly. As shown in FIG. 6, WEA Content IE 604 may comprise a Message Identifier parameter 605A, a Serial Number parameter 605B, a Data Coding Scheme parameter 605C, and an Alert Text parameter 605D. Message Identifier parameter 605A may identify the source and type of a WEA alert described by WEA Content IE 604. Serial Number parameter 605B may identify a specific WEA alert for which WEA Content IE 604 conveys the contents. Data Coding Scheme parameter 605C may identify the alphabet/coding and the language applied variations characterizing that WEA alert. Alert Text parameter 605D may comprise the contents of the WEA alert.

ECGI IE 606 may be usable to indicate an E-UTRAN Cell Global Identifier (ECGI) associated with the serving cell of a ProSe public safety relay UE transmitting discovery message 600. MBMS Related Information IE 608 may be usable to indicate a Temporary Mobile Group Identity (TMGI) associated with an eMBMS broadcast session for which the ProSe public safety relay UE transmitting discovery message 600 is relaying traffic. In various embodiments, WEA Content IE 604, ECGI IE 606, and MBMS Related Information IE 608 may be conditional IEs, such that the presence of one is conditional upon the absence of the others. In some such embodiments, if WEA Content IE 604 is present within discovery message 600, ECGI IE 606 and MBMS Related Information IE 608 may be absent. The embodiments are not limited in this context.

Figure 7:
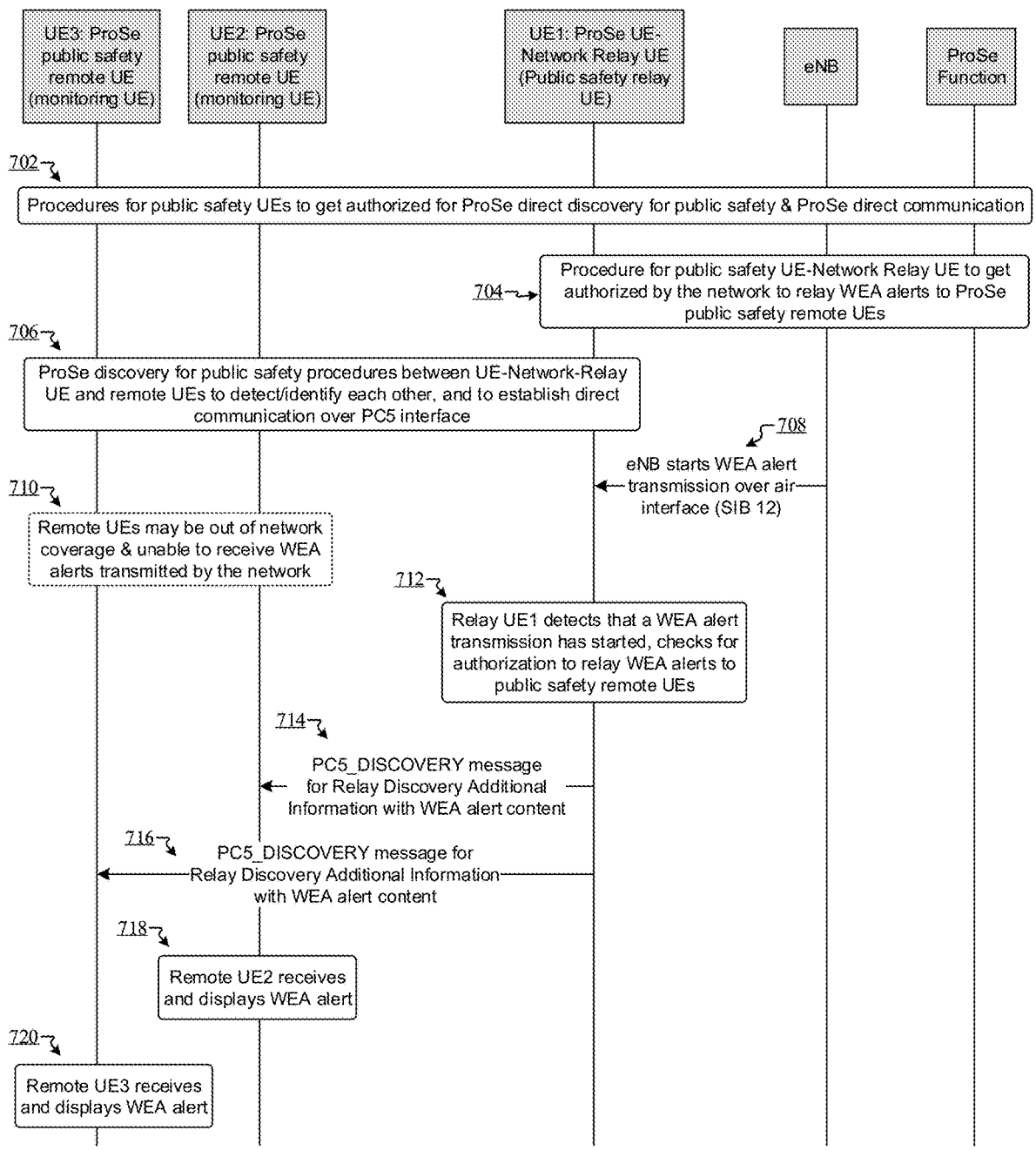
FIG. 7 is a block diagram illustrating an example, non-limiting embodiment of a first operations flow in accordance with various aspects described herein.

FIG. 7 illustrates an example operations flow 700 that may be representative of the use of ProSe direct discovery signaling to relay the contents of WEA alerts or other alert messages according to various embodiments. For example, operations flow 700 may be representative of operations that may be performed in operating environment 500 of FIG. 5 in some embodiments in which PS-UE 304-2 relays the contents of emergency alert message 306 to PS-UE 305 as emergency alert information 512 contained in discovery message 510.

As shown in FIG. 7, operations flow 700 may begin at 702, where any or all of a UE1, a UE2, and a UE3 may engage in procedures for public safety UEs to get authorized for ProSe direct discovery for public safety and ProSe direct communication. In some embodiments, rather than obtaining such authorization via such procedures, any or all of UE1, UE2, and UE3 may be pre-provisioned with such authorization, or may comprise a USIM pre-provisioned with such authorization. At 704, UE1 may engage in a procedure to get authorized by the network to relay WEA alerts to ProSe public safety remote UEs in conjunction with serving as a public safety UE-Network Relay UE. In some embodiments, rather than obtaining such authorization via such a procedure, UE1 may be pre-provisioned with such authorization, or may comprise a USIM pre-provisioned with such authorization.

At 706, UE1, UE2, and UE3 may engage in ProSe discovery for public safety procedures in order to detect/identify each other and establish direct communication via a PC5 interface. At 708, an eNB may start WEA alert transmission over an air interface, such as via transmission of SIB 12. At 710, UE2 and UE3, both operating as ProSe public safety remote UEs, may be out of network coverage and unable to receive WEA alerts transmitted by the network. At 712, UE1 may detect that WEA alert transmission has started, and may check for authorization to relay WEA alerts to public safety remote UEs. At 714 and 716, having confirmed that it possesses such authorization, UE1 may transmit, to UE2 and UE3, respective PC5_DISCOVERY for RDAI messages that contain WEA alert content IEs comprising the contents of the WEA alert transmitted at 708. UE2 and UE3 may, at 718 and 720 respectively, receive the PC5_DISCOVERY for RDAI messages transmitted at 714 and 716, and display the WEA alert described by the WEA alert content IEs comprised in those messages.

Figure 8:
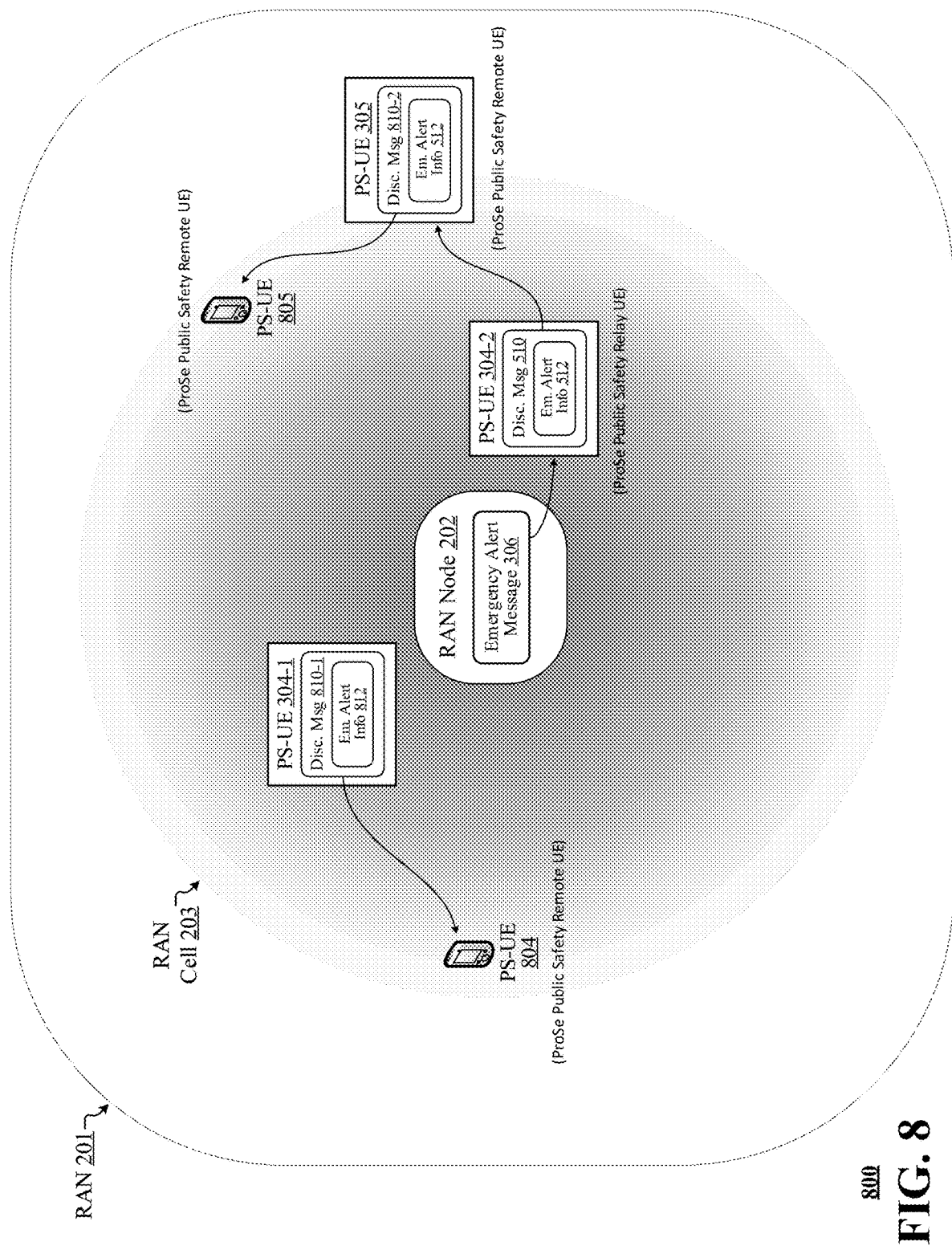
FIG. 8 is a block diagram illustrating an example, non-limiting embodiment of a fifth operating environment in accordance with various aspects described herein.

FIG. 8 illustrates an example of an operating environment 800 that may be representative of the implementation of additional novel techniques for disseminating WEA alerts or other alert messages according to various embodiments. In operating environment 800, PS-UE 304-1 is authorized to generate WEA alerts or other alerts or notifications and disseminate them to ProSe public safety remote UEs in its vicinity. In some embodiments, PS-UE 304-1 may obtain such authorization via a network ProSe function using defined authorization procedures. In various other embodiments, PS-UE 304-1 may be pre-provisioned with authorization to generate WEA alerts or other alerts or notifications, or such authorization may be pre-provisioned on a USIM of PS-UE 304-1. The embodiments are not limited in this context.

In the example depicted in FIG. 8, PS-UE 304-1 sends—to a PS-UE 804 comprising a ProSe public safety remote UE—a discovery message 810-1. Discovery message 810-1 includes emergency alert information 812, which comprises the contents of a WEA alert or other alert or notification generated by PS-UE 304-1. According to some embodiments, discovery message 810-1 may be a ProSe direct discovery message, such as a PC5_DISCOVERY with Relay Discovery Additional Information message or other PC5_DISCOVERY message. According to various embodiments, discovery message 810-1 may comprise a same or similar format as discovery message 510 of FIG. 5 and/or discovery message 600 of FIG. 6. The embodiments are not limited in this context.

In operating environment 800, PS-UE 305 may be authorized to act as both a relayee and a relayer of the contents of WEA alerts or other alerts or notifications, such as emergency alert message 306. In some embodiments, PS-UE 305 may obtain such authorization via a network ProSe function using defined authorization procedures. In various other embodiments, PS-UE 305 may be pre-provisioned with authorization to act as both a relayee and a relayer of the contents of WEA alerts or other alerts or notifications, or such authorization may be pre-provisioned on a USIM of PS-UE 305. The embodiments are not limited in this context.

In the example depicted in FIG. 8, PS-UE 305 receives—from PS-UE 304-2 acting as a ProSe public safety relay UE—discovery message 510, which includes emergency alert information 512 comprising the contents of emergency alert message 306. PS-UE 305 then sends—to a PS-UE 805 comprising a ProSe public safety remote UE—a discovery message 810-2. Discovery message 810-2 includes the emergency alert information 512 comprised in the discovery message 510 received from PS-UE 304-2. According to some embodiments, discovery message 810-2 may be a ProSe direct discovery message, such as a PC5_DISCOVERY with Relay Discovery Additional Information message or other PC5_DISCOVERY message. According to various embodiments, discovery message 810-2 may comprise a same or similar format as discovery message 510 of FIG. 5, discovery message 600 of FIG. 6, and/or discovery message 810-1. The embodiments are not limited in this context.

Figure 9:
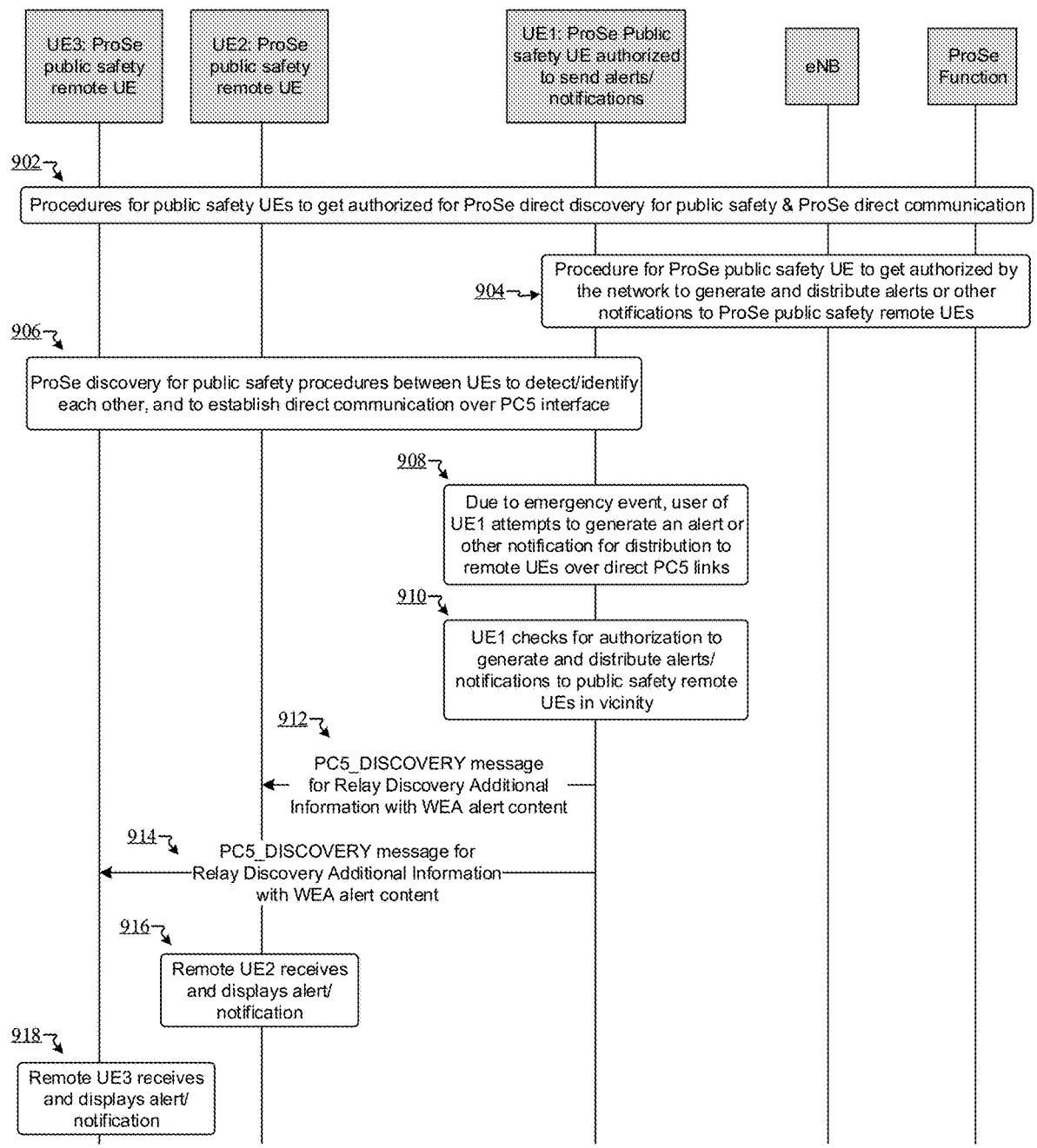
FIG. 9 is a block diagram illustrating an example, non-limiting embodiment of a second operations flow in accordance with various aspects described herein.

FIG. 9 illustrates an example operations flow 900 that may be representative of the use of ProSe direct discovery signaling to disseminate the contents of WEA alerts or other alert messages or notifications generated by an authorized ProSe public safety UE according to some embodiments. For example, operations flow 900 may be representative of operations that may be performed in operating environment 800 of FIG. 8 in various embodiments in which PS-UE 304-1 generates a WEA alert or other alert or notification and disseminates its contents as emergency alert information 812 comprised in discovery message 810-1.

As shown in FIG. 9, operations flow 900 may begin at 902, where any or all of a UE1, a UE2, and a UE3 may engage in procedures for public safety UEs to get authorized for ProSe direct discovery for public safety and ProSe direct communication. In some embodiments, rather than obtaining such authorization via such procedures, any or all of UE1, UE2, and UE3 may be pre-provisioned with such authorization, or may comprise a USIM pre-provisioned with such authorization. At 904, UE1 may engage in a procedure to get authorized by the network to generate and distribute WEA alerts or other alerts or notifications to ProSe public safety remote UEs. In some embodiments, rather than obtaining such authorization via such a procedure, UE1 may be pre-provisioned with such authorization, or may comprise a USIM pre-provisioned with such authorization.

At 906, UE1, UE2, and UE3 may engage in ProSe discovery for public safety procedures in order to detect/identify each other and establish direct communication via a PC5 interface. At 908, due to an emergency event, a user of UE1 may attempt to generate a WEA alert or other alert or notification for distribution to public safety remote UEs over direct PC5 links. At 910, UE1 may check for authorization to generate and distribute alerts/notifications to public safety remote UEs in its vicinity. At 912 and 914, having confirmed that it possesses such authorization and having generated the desired WEA alert or other alert or notification, UE1 may transmit, to UE2 and UE3, respective PC5_DISCOVERY for RDAI messages that contain WEA alert content IEs comprising the contents of the generated WEA alert or other alert or notification. UE2 and UE3 may, at 916 and 918 respectively, receive the PC5_DISCOVERY for RDAI messages transmitted at 912 and 914, and display the WEA alert or other alert or notification described by the WEA alert content IEs comprised in those messages.

Figure 10:
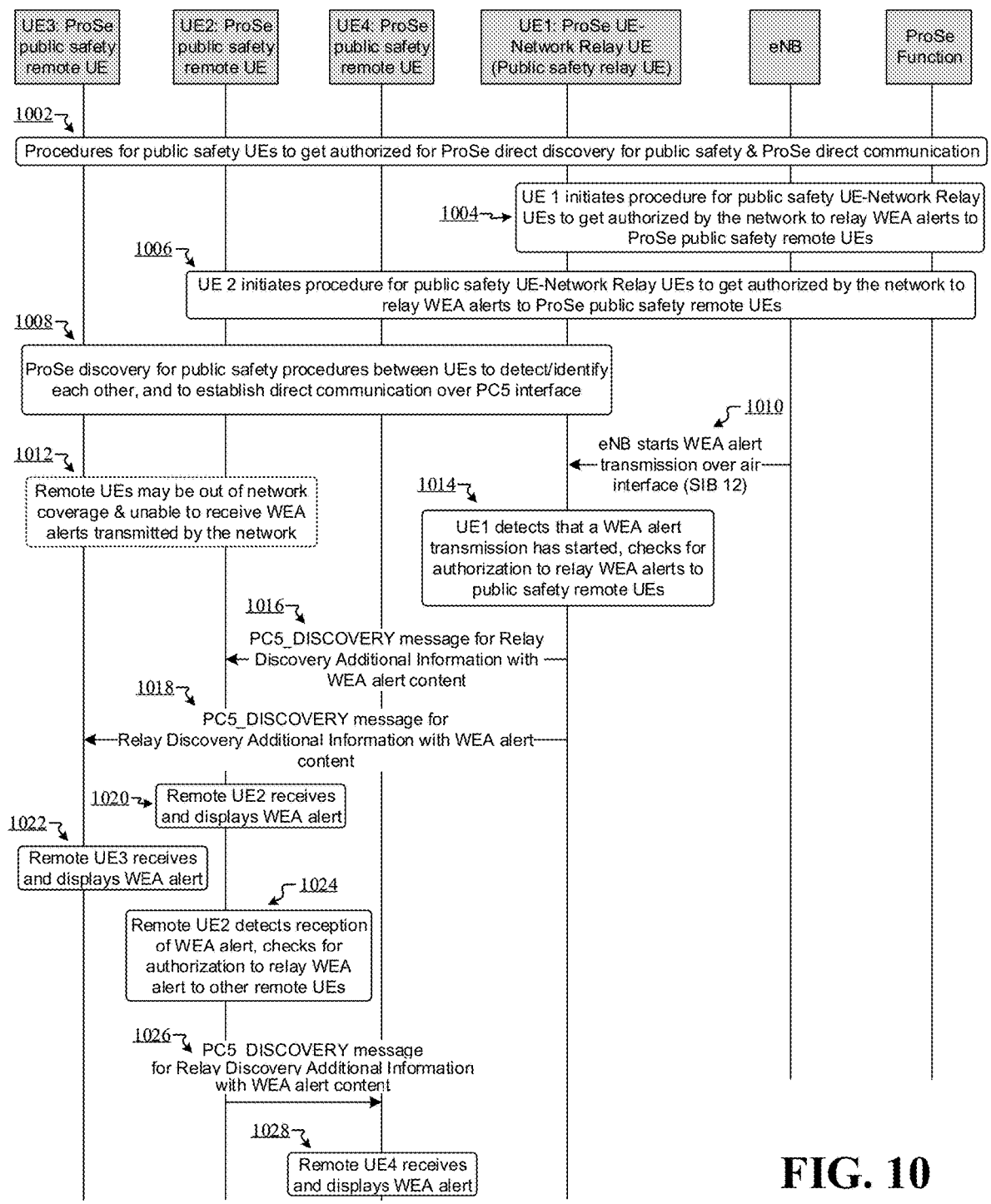
FIG. 10 is a block diagram illustrating an example, non-limiting embodiment of a third operations flow in accordance with various aspects described herein.

FIG. 10 illustrates an example operations flow 1000 that may be representative of the use, by a ProSe public safety remote UE that is a relayee of the contents of a WEA alert or other alert message or notification, of ProSe direct discovery signaling to relay those contents to another ProSe public safety remote UE according to some embodiments. For example, operations flow 1000 may be representative of operations that may be performed in operating environment 800 of FIG. 8 in various embodiments in which PS-UE 305 obtains emergency alert information 512 from the discovery message 510 received from PS-UE 304-2, and then relays emergency alert information 512 to PS-UE 805 by including emergency alert information 512 in a discovery message 810-2 that PS-UE 305 sends to PS-UE 805.

As shown in FIG. 10, operations flow 1000 may begin at 1002, where any or all of a UE1, a UE2, a UE3, and a UE4 may engage in procedures for public safety UEs to get authorized for ProSe direct discovery for public safety and ProSe direct communication. In some embodiments, rather than obtaining such authorization via such procedures, any or all of UE1, UE2, UE3, and UE4 may be pre-provisioned with such authorization, or may comprise a USIM pre-provisioned with such authorization. At 1004, UE1 may engage in a procedure to get authorized by the network to relay WEA alerts to ProSe public safety remote UEs. In some embodiments, rather than obtaining such authorization via such a procedure, UE1 may be pre-provisioned with such authorization, or may comprise a USIM pre-provisioned with such authorization. At 1006, UE2 may engage in the procedure to get authorized by the network to relay WEA alerts to ProSe public safety remote UEs. In some embodiments, rather than obtaining such authorization via such a procedure, UE2 may be pre-provisioned with such authorization, or may comprise a USIM pre-provisioned with such authorization.

At 1008, UE1, UE2, UE3, and UE4 may engage in ProSe discovery for public safety procedures in order to detect/identify each other and establish direct communication via a PC5 interface. At 1010, an eNB may start WEA alert transmission over an air interface, such as via transmission of SIB 12. At 1012, UE2, UE3, and UE4, each operating as a ProSe public safety remote UE, may be out of network coverage and unable to receive WEA alerts transmitted by the network. At 1014, UE1 may detect that WEA alert transmission has started, and may check for authorization to relay WEA alerts to public safety remote UEs. At 1014 and 1016, having confirmed that it possesses such authorization, UE1 may transmit, to UE2 and UE3, respective PC5_DISCOVERY for RDAI messages that contain WEA alert content IEs comprising the contents of the WEA alert transmitted at 1008. UE2 and UE3 may, at 1020 and 1022 respectively, receive the PC5_DISCOVERY for RDAI messages transmitted at 1016 and 1018, and display the WEA alert described by the WEA alert content IEs comprised in those messages.

At 1024, UE2 may detect reception of the WEA alert, and may check for authorization to relay WEA alerts to other public safety remote UEs. At 1026, having confirmed that it possesses such authorization, UE2 may transmit, to UE4, a PC5_DISCOVERY for RDAI message that contains a WEA alert content IE comprising the contents of the WEA alert. At 1028, UE4 may receive the PC5_DISCOVERY for RDAI message transmitted at 1026, and display the WEA alert described by the WEA alert content IE comprised in that message.

Figure 11:
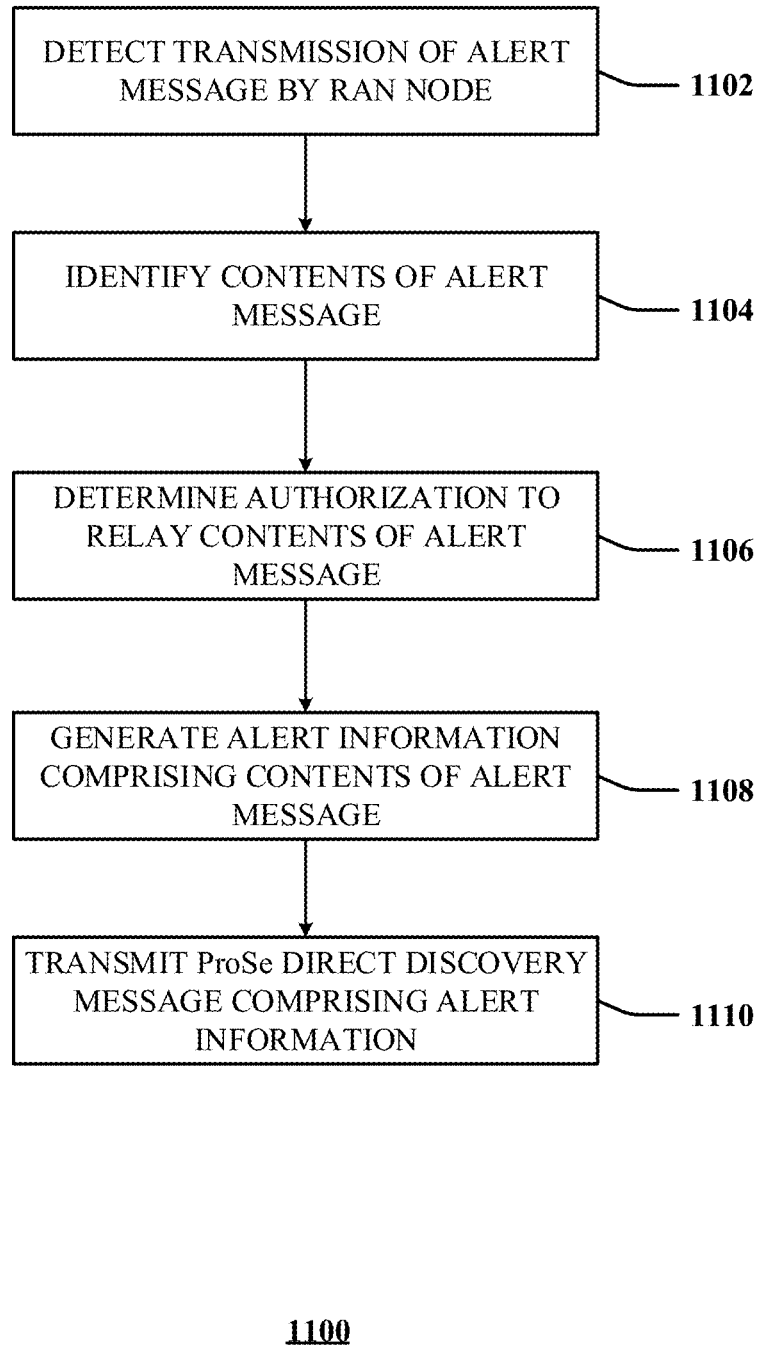
FIG. 11 depicts an illustrative embodiment of a method in accordance with various aspects described herein.

FIG. 11 depicts an illustrative embodiment of a method 1100 in accordance with various aspects described herein. Method 1100 may be representative of operations that may be performed by PS-UE 304-2 in operating environment 500 of FIG. 5 according to some embodiments. As shown in FIG. 11, a transmission of an alert message by a RAN node may be detected at 1102. For example, in operating environment 500 of FIG. 5, PS-UE 304-2 may detect transmission of emergency alert message 306 by RAN node 202. At 1104, the contents of the alert message may be identified. For example, in operating environment 500 of FIG. 5, PS-UE 304-2 may identify the contents of emergency alert message 306.

At 1106, it may be determined that authorization has been provided to relay the contents of the alert message. For example, in operating environment 500 of FIG. 5, PS-UE 304-2 may determine that it is authorized to relay the contents of emergency alert message 306 to nearby ProSe public safety remote UEs such as PS-UE 305. At 1108, alert information may be generated that comprises the contents of the alert message. For example, in operating environment 500 of FIG. 5, PS-UE 304-2 may generate emergency alert information 512, which may comprise the contents of emergency alert message 306. At 1110, a ProSe direct discovery message may be transmitted that comprises the alert information generated at 1108. For example, in operating environment 500 of FIG. 5, PS-UE 304-2 may transmit discovery message 510, which may be a ProSe direct discovery message and may comprise emergency alert information 512. The embodiments are not limited to these examples.

While for purposes of simplicity of explanation, the respective processes are shown and described as a series of blocks in FIG. 11, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 12:
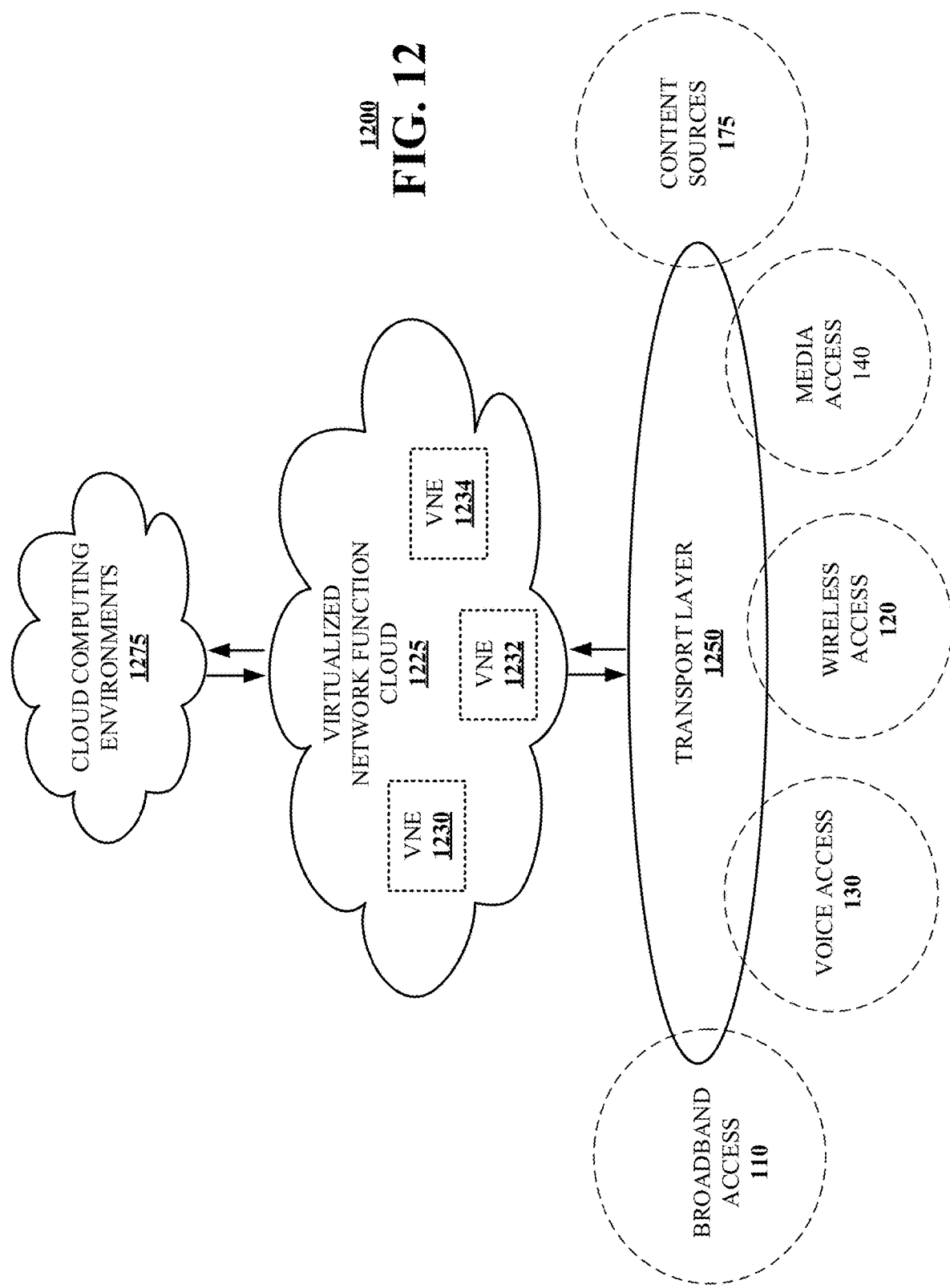
FIG. 12 is a block diagram illustrating an example, non-limiting embodiment of a virtualized communication network in accordance with various aspects described herein.

Referring now to FIG. 12, a block diagram 1200 is shown illustrating an example, non-limiting embodiment of a virtualized communication network in accordance with various aspects described herein. In particular a virtualized communication network is presented that can be used to implement some or all of the subsystems and functions of system 100, the subsystems and functions of RAN 201 and/or RAN node 202, and the operations of operations flows 700, 900, and 1000 presented in FIGS. 1-5 and 7-10. For example, virtualized communication network 1200 can facilitate in whole or in part detecting, by a wireless communication device, a transmission, by a radio access network node, of an alert message, identifying contents of the alert message, determining that the wireless communication device is authorized to relay the contents of the alert message, generating alert information comprising the contents of the alert message, and transmitting a ProSe direct discovery message comprising the alert information.

In particular, a cloud networking architecture is shown that leverages cloud technologies and supports rapid innovation and scalability via a transport layer 1250, a virtualized network function cloud 1225 and/or one or more cloud computing environments 1275. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 1230, 1232, 1234, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 1230 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 1250 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 1230, 1232 or 1234. These network elements can be included in transport layer 1250.

The virtualized network function cloud 1225 interfaces with the transport layer 1250 to provide the VNEs 1230, 1232, 1234, etc. to provide specific NFVs. In particular, the virtualized network function cloud 1225 leverages cloud operations, applications, and architectures to support networking workloads. The virtualized network elements 1230, 1232 and 1234 can employ network function software that provides either a one-for-one mapping of traditional network element function or alternately some combination of network functions designed for cloud computing. For example, VNEs 1230, 1232 and 1234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 1230, 1232, 1234, etc. can be instantiated and managed using an orchestration approach similar to those used in cloud compute services.

The cloud computing environments 1275 can interface with the virtualized network function cloud 1225 via APIs that expose functional capabilities of the VNEs 1230, 1232, 1234, etc. to provide the flexible and expanded capabilities to the virtualized network function cloud 1225. In particular, network workloads may have applications distributed across the virtualized network function cloud 1225 and cloud computing environment 1275 and in the commercial cloud, or might simply orchestrate workloads supported entirely in NFV infrastructure from these third party locations.

Figure 13:
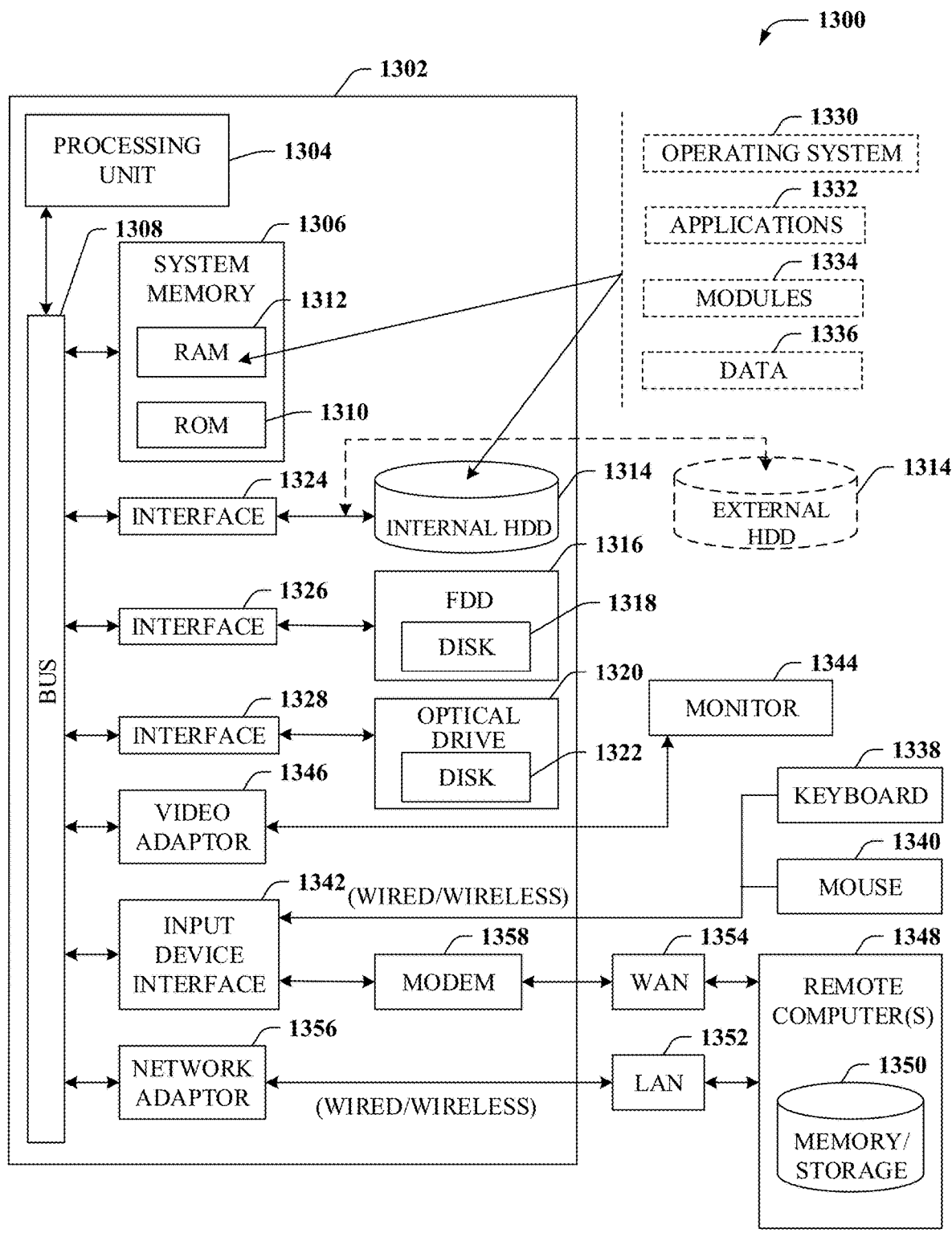
FIG. 13 is a block diagram of an example, non-limiting embodiment of a computing environment in accordance with various aspects described herein.

Turning now to FIG. 13, there is illustrated a block diagram of a computing environment in accordance with various aspects described herein. In order to provide additional context for various embodiments of the embodiments described herein, FIG. 13 and the following discussion are intended to provide a brief, general description of a suitable computing environment 1300 in which the various embodiments of the subject disclosure can be implemented. In particular, computing environment 1300 can be used in the implementation of network elements 150, 152, 154, 156, access terminal 112, base station or access point 122, switching device 132, media terminal 142, and/or VNEs 1230, 1232, 1234, etc. Each of these devices can be implemented via computer-executable instructions that can run on one or more computers, and/or in combination with other program modules and/or as a combination of hardware and software. For example, computing environment 1300 can facilitate in whole or in part detecting, by a wireless communication device, a transmission, by a radio access network node, of an alert message, identifying contents of the alert message, determining that the wireless communication device is authorized to relay the contents of the alert message, generating alert information comprising the contents of the alert message, and transmitting a ProSe direct discovery message comprising the alert information.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 13, the example environment can comprise a computer 1302, the computer 1302 comprising a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multiprocessor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 comprises ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also comprise a high-speed RAM such as static RAM for caching data.

The computer 1302 further comprises an internal hard disk drive (HDD) 1314 (e.g., EIDE, SATA), which internal HDD 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The HDD 1314, magnetic FDD 1316 and optical disk drive 1320 can be connected to the system bus 1308 by a hard disk drive interface 1324, a magnetic disk drive interface 1326 and an optical drive interface 1328, respectively. The hard disk drive interface 1324 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, comprising an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can comprise a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of display device can be also connected to the system bus 1308 via an interface, such as a video adapter 1346. It will also be appreciated that in alternative embodiments, a monitor 1344 can also be any display device (e.g., another computer having a display, a smart phone, a tablet computer, etc.) for receiving display information associated with computer 1302 via any communication means, including via the Internet and cloud-based networks. In addition to the monitor 1344, a computer typically comprises other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically comprises many or all of the elements described relative to the computer 1302, although, for purposes of brevity, only a remote memory/storage device 1350 is illustrated. The logical connections depicted comprise wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the LAN 1352 through a wired and/or wireless communication network interface or adapter 1356. The adapter 1356 can facilitate wired or wireless communication to the LAN 1352, which can also comprise a wireless AP disposed thereon for communicating with the adapter 1356.

When used in a WAN networking environment, the computer 1302 can comprise a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 14:
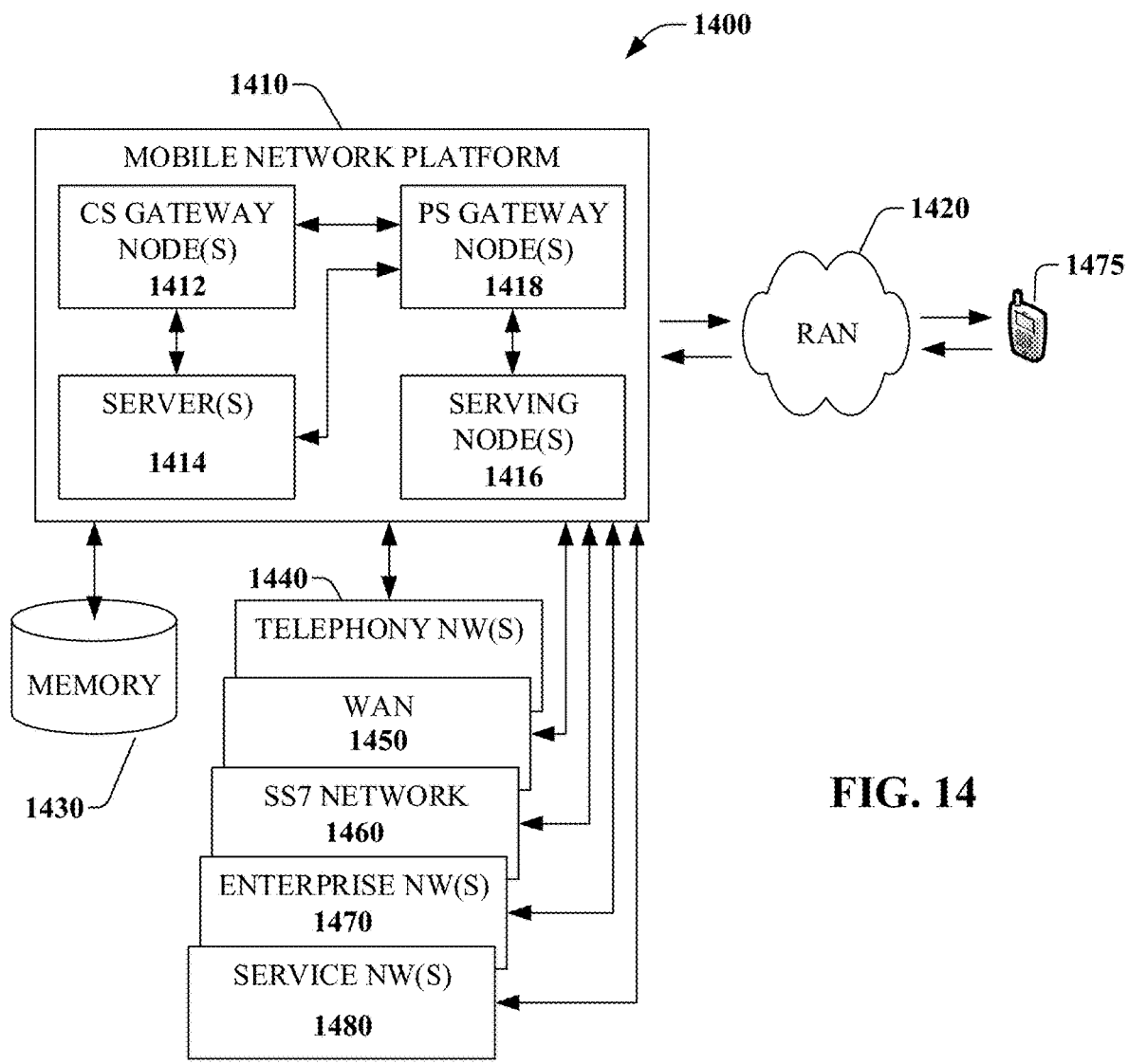
FIG. 14 is a block diagram of an example, non-limiting embodiment of a mobile network platform in accordance with various aspects described herein.

Turning now to FIG. 14, an embodiment 1400 of a mobile network platform 1410 is shown that is an example of network elements 150, 152, 154, 156, and/or VNEs 1230, 1232, 1234, etc. For example, platform 1410 can facilitate in whole or in part detecting, by a wireless communication device, a transmission, by a radio access network node, of an alert message, identifying contents of the alert message, determining that the wireless communication device is authorized to relay the contents of the alert message, generating alert information comprising the contents of the alert message, and transmitting a ProSe direct discovery message comprising the alert information. In one or more embodiments, the mobile network platform 1410 can generate and receive signals transmitted and received by base stations or access points such as base station or access point 122. Generally, mobile network platform 1410 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 1410 can be included in telecommunications carrier networks, and can be considered carrier-side components as discussed elsewhere herein. Mobile network platform 1410 comprises CS gateway node(s) 1412 which can interface CS traffic received from legacy networks like telephony network(s) 1440 (e.g., public switched telephone network (PSTN), or public land mobile network (PLMN)) or a signaling system #7 (SS7) network 1460. CS gateway node(s) 1412 can authorize and authenticate traffic (e.g., voice) arising from such networks. Additionally, CS gateway node(s) 1412 can access mobility, or roaming, data generated through SS7 network 1460; for instance, mobility data stored in a visited location register (VLR), which can reside in memory 1430. Moreover, CS gateway node(s) 1412 interfaces CS-based traffic and signaling and PS gateway node(s) 1418. As an example, in a 3GPP UMTS network, CS gateway node(s) 1412 can be realized at least in part in gateway GPRS support node(s) (GGSN). It should be appreciated that functionality and specific operation of CS gateway node(s) 1412, PS gateway node(s) 1418, and serving node(s) 1416, is provided and dictated by radio technology(ies) utilized by mobile network platform 1410 for telecommunication over a radio access network 1420 with other devices, such as a radiotelephone 1475.

In addition to receiving and processing CS-switched traffic and signaling, PS gateway node(s) 1418 can authorize and authenticate PS-based data sessions with served mobile devices. Data sessions can comprise traffic, or content(s), exchanged with networks external to the mobile network platform 1410, like wide area network(s) (WANs) 1450, enterprise network(s) 1470, and service network(s) 1480, which can be embodied in local area network(s) (LANs), can also be interfaced with mobile network platform 1410 through PS gateway node(s) 1418. It is to be noted that WANs 1450 and enterprise network(s) 1470 can embody, at least in part, a service network(s) like IP multimedia subsystem (IMS). Based on radio technology layer(s) available in technology resource(s) or radio access network 1420, PS gateway node(s) 1418 can generate packet data protocol contexts when a data session is established; other data structures that facilitate routing of packetized data also can be generated. To that end, in an aspect, PS gateway node(s) 1418 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1400, mobile network platform 1410 also comprises serving node(s) 1416 that, based upon available radio technology layer(s) within technology resource(s) in the radio access network 1420, convey the various packetized flows of data streams received through PS gateway node(s) 1418. It is to be noted that for technology resource(s) that rely primarily on CS communication, server node(s) can deliver traffic without reliance on PS gateway node(s) 1418; for example, server node(s) can embody at least in part a mobile switching center. As an example, in a 3GPP UMTS network, serving node(s) 1416 can be embodied in serving GPRS support node(s) (SGSN).

For radio technologies that exploit packetized communication, server(s) 1414 in mobile network platform 1410 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 1410. Data streams (e.g., content(s) that are part of a voice call or data session) can be conveyed to PS gateway node(s) 1418 for authorization/authentication and initiation of a data session, and to serving node(s) 1416 for communication thereafter. In addition to application server, server(s) 1414 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 1410 to ensure network's operation and data integrity in addition to authorization and authentication procedures that CS gateway node(s) 1412 and PS gateway node(s) 1418 can enact. Moreover, provisioning server(s) can provision services from external network(s) like networks operated by a disparate service provider; for instance, WAN 1450 or Global Positioning System (GPS) network(s) (not shown). Provisioning server(s) can also provision coverage through networks associated to mobile network platform 1410 (e.g., deployed and operated by the same service provider), such as the distributed antennas networks shown in FIG. 1(*s*) that enhance wireless service coverage by providing more network coverage.

It is to be noted that server(s) 1414 can comprise one or more processors configured to confer at least in part the functionality of mobile network platform 1410. To that end, the one or more processor can execute code instructions stored in memory 1430, for example. It is should be appreciated that server(s) 1414 can comprise a content manager, which operates in substantially the same manner as described hereinbefore.

In example embodiment 1400, memory 1430 can store information related to operation of mobile network platform 1410. Other operational information can comprise provisioning information of mobile devices served through mobile network platform 1410, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1430 can also store information from at least one of telephony network(s) 1440, WAN 1450, SS7 network 1460, or enterprise network(s) 1470. In an aspect, memory 1430 can be, for example, accessed as part of a data store component or as a remotely connected memory store.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 15:
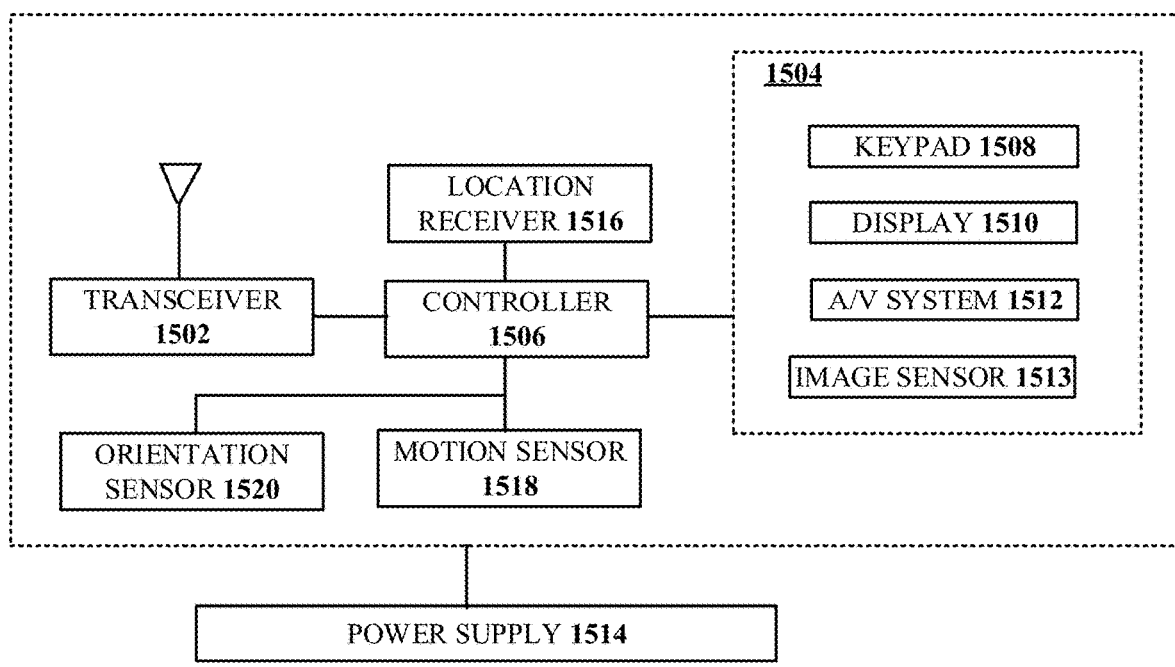
FIG. 15 is a block diagram of an example, non-limiting embodiment of a communication device in accordance with various aspects described herein.

Turning now to FIG. 15, an illustrative embodiment of a communication device 1500 is shown. The communication device 1500 can serve as an illustrative embodiment of devices such as data terminals 114, mobile devices 124, vehicle 126, display devices 144 or other client devices for communication via either communications network 125. For example, computing device 1500 can facilitate in whole or in part detecting, by a wireless communication device, a transmission, by a radio access network node, of an alert message, identifying contents of the alert message, determining that the wireless communication device is authorized to relay the contents of the alert message, generating alert information comprising the contents of the alert message, and transmitting a ProSe direct discovery message comprising the alert information.

The communication device 1500 can comprise a wireline and/or wireless transceiver 1502 (herein transceiver 1502), a user interface (UI) 1504, a power supply 1514, a location receiver 1516, a motion sensor 1518, an orientation sensor 1520, and a controller 1506 for managing operations thereof. The transceiver 1502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 1502 can also be adapted to support circuit-switched wireline access technologies (such as PSTN), packet-switched wireline access technologies (such as TCP/IP, VoIP, etc.), and combinations thereof.

The UI 1504 can include a depressible or touch-sensitive keypad 1508 with a navigation mechanism such as a roller ball, a joystick, a mouse, or a navigation disk for manipulating operations of the communication device 1500. The keypad 1508 can be an integral part of a housing assembly of the communication device 1500 or an independent device operably coupled thereto by a tethered wireline interface (such as a USB cable) or a wireless interface supporting for example Bluetooth®. The keypad 1508 can represent a numeric keypad commonly used by phones, and/or a QWERTY keypad with alphanumeric keys. The UI 1504 can further include a display 1510 such as monochrome or color LCD (Liquid Crystal Display), OLED (Organic Light Emitting Diode) or other suitable display technology for conveying images to an end user of the communication device 1500. In an embodiment where the display 1510 is touch-sensitive, a portion or all of the keypad 1508 can be presented by way of the display 1510 with navigation features.

The display 1510 can use touch screen technology to also serve as a user interface for detecting user input. As a touch screen display, the communication device 1500 can be adapted to present a user interface having graphical user interface (GUI) elements that can be selected by a user with a touch of a finger. The display 1510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1510 can be an integral part of the housing assembly of the communication device 1500 or an independent device communicatively coupled thereto by a tethered wireline interface (such as a cable) or a wireless interface.

The UI 1504 can also include an audio system 1512 that utilizes audio technology for conveying low volume audio (such as audio heard in proximity of a human ear) and high volume audio (such as speakerphone for hands free operation). The audio system 1512 can further include a microphone for receiving audible signals of an end user. The audio system 1512 can also be used for voice recognition applications. The UI 1504 can further include an image sensor 1513 such as a charged coupled device (CCD) camera for capturing still or moving images.

The power supply 1514 can utilize common power management technologies such as replaceable and rechargeable batteries, supply regulation technologies, and/or charging system technologies for supplying energy to the components of the communication device 1500 to facilitate long-range or short-range portable communications. Alternatively, or in combination, the charging system can utilize external power sources such as DC power supplied over a physical interface such as a USB port or other suitable tethering technologies.

The location receiver 1516 can utilize location technology such as a global positioning system (GPS) receiver capable of assisted GPS for identifying a location of the communication device 1500 based on signals generated by a constellation of GPS satellites, which can be used for facilitating location services such as navigation. The motion sensor 1518 can utilize motion sensing technology such as an accelerometer, a gyroscope, or other suitable motion sensing technology to detect motion of the communication device 1500 in three-dimensional space. The orientation sensor 1520 can utilize orientation sensing technology such as a magnetometer to detect the orientation of the communication device 1500 (north, south, west, and east, as well as combined orientations in degrees, minutes, or other suitable orientation metrics).

The communication device 1500 can use the transceiver 1502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1500.

Other components not shown in FIG. 15 can be used in one or more embodiments of the subject disclosure. For instance, the communication device 1500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A wireless communication device, comprising:
a processing system including a processor; and
a memory that stores executable instructions that, when executed by the processing system, facilitate performance of operations, the operations comprising:
detecting a transmission, by a radio access network node, of an alert message;
identifying contents of the alert message;
determining that the wireless communication device is authorized to relay the contents of the alert message;
generating alert information comprising the contents of the alert message; and
transmitting, to a second wireless communication device, a first proximity services (ProSe) direct discovery message comprising the alert information, wherein the second wireless communication device is pre-provisioned with a first authorization to receive the alert information from the first ProSe direct discovery message, and wherein the second wireless communication device is pre-provisioned with a second authorization to relay the alert information via a second ProSe direct discovery message.

2. The wireless communication device of claim 1, wherein the alert message is comprised in a system information block (SIB), and wherein the second wireless communication device transmits the alert information to a third wireless communication device via the second ProSe direct discovery message.

3. The wireless communication device of claim 1, wherein the ProSe direct discovery message includes a wireless emergency alert (WEA) content information element (IE) that comprises the alert information.

4. The wireless communication device of claim 3, wherein the WEA content IE includes a parameter comprising a serial number identifying the alert message.

5. The wireless communication device of claim 3, wherein the WEA content IE includes a parameter comprising text of the alert message.

6. The wireless communication device of claim 1, wherein the ProSe direct discovery message comprises a PC5_DISCOVERY message for relay discovery additional information (RDAI).

7. The wireless communication device of claim 1, wherein the ProSe direct discovery message includes a relay discovery additional information (RDAI) composition information element (IE), wherein the RDAI composition IE includes a first bit comprising a value set to indicate a presence of the alert information.

8. The wireless communication device of claim 7, wherein the RDAI composition IE includes a second bit comprising a value set to indicate an absence of an evolved universal mobile telecommunications system terrestrial radio access network (E-UTRAN) cell global identifier (ECGI) IE.

9. The wireless communication device of claim 7, wherein the RDAI composition IE includes a third bit comprising a value set to indicate an absence of a multimedia broadcast multicast service (MBMS) related information IE.

10. A non-transitory machine-readable medium, comprising executable instructions that, when executed by a processing system of a wireless communication device, the processing system including a processor, facilitate performance of operations, the operations comprising:
    detecting a transmission, by a radio access network node, of an alert message;
    identifying contents of the alert message;
    determining that the wireless communication device is authorized to relay the contents of the alert message;
    generating alert information comprising the contents of the alert message; and
    transmitting, to a second wireless communication device, a first proximity services (ProSe) direct discovery message comprising the alert information, wherein the ProSe direct discovery message comprises a relay discovery additional information (RDAI) composition information element (IE) that includes a first bit comprising a value set to indicate a presence of the alert information, and wherein the second wireless communication device is pre-provisioned with a first authorization to receive the alert information from the first ProSe direct discovery message, and wherein the second wireless communication device is pre-provisioned with a second authorization to relay the alert information via a second ProSe direct discovery message.

11. The non-transitory machine-readable medium of claim 10, wherein the alert message is comprised in a system information block (SIB).

12. The non-transitory machine-readable medium of claim 10, wherein the ProSe direct discovery message includes a wireless emergency alert (WEA) content information element (IE) that comprises the alert information.

13. The non-transitory machine-readable medium of claim 12, wherein the WEA content IE includes a parameter comprising a serial number identifying the alert message.

14. The non-transitory machine-readable medium of claim 12, wherein the WEA content IE includes a parameter comprising text of the alert message.

15. The non-transitory machine-readable medium of claim 10, wherein the ProSe direct discovery message comprises a PC5_DISCOVERY message for relay discovery additional information (RDAI).

16. The non-transitory machine-readable medium of claim 10, wherein the RDAI composition IE includes a second bit comprising a value set to indicate an absence of an evolved universal mobile telecommunications system terrestrial radio access network (E-UTRAN) cell global identifier (ECGI) IE.

17. The non-transitory machine-readable medium of claim 10, wherein the RDAI composition IE includes a third bit comprising a value set to indicate an absence of a multimedia broadcast multicast service (MBMS) related information IE.

18. A method, comprising:
    detecting, by a processing system of a wireless communication device, the processing system comprising a processor, a transmission, by a radio access network node, of an alert message;
    identifying, by the processing system, contents of the alert message;
    determining, by the processing system, that the wireless communication device is authorized to relay the contents of the alert message;
    generating, by the processing system, alert information comprising the contents of the alert message; and
    transmitting, by the processing system, a first proximity services (ProSe) direct discovery message to a second wireless communication device, wherein the ProSe direct discovery message includes:
    a wireless emergency alert (WEA) content information element (IE) that comprises the alert information; and
    a relay discovery additional information (RDAI) composition IE that includes a bit comprising a value set to indicate a presence of the WEA content IE,
    and wherein the second wireless communication device is pre-provisioned with a first authorization to receive the alert information from the first ProSe direct discovery message, and wherein the second wireless communication device is pre-provisioned with a second authorization to relay the alert information via a second ProSe direct discovery message.

19. The method of claim 18, wherein the alert message is comprised in a system information block (SIB).

20. The method of claim 18, wherein the WEA content IE includes:
    a first parameter comprising a serial number identifying the alert message; and
    a second parameter comprising text of the alert message.

* * * * *